US012753107B2

(12) United States Patent
Machura et al.

(10) Patent No.: US 12,753,107 B2
(45) Date of Patent: Oct. 6, 2026

(54) ROLLER FOR GLASS SHEET CONVEYING DEVICE

(71) Applicant: SAINT-GOBAIN GLASS FRANCE, Courbevoie (FR)

(72) Inventors: Christophe Machura, Chevincourt (FR); Benoit Lemaitre, Villers sur Coudun (FR); Thibault Rapenne, Noyon (FR); Naseer Asghar, Baesweiler (DE)

(73) Assignee: SAINT-GOBAIN SEKURIT FRANCE, Thourotte (FR)

(*) Notice: Subject to any disclaimer, the term of this patent is extended or adjusted under 35 U.S.C. 154(b) by 152 days.

(21) Appl. No.: 18/555,364

(22) PCT Filed: Apr. 12, 2022

(86) PCT No.: PCT/FR2022/050687

§ 371 (c)(1),
(2) Date: Oct. 13, 2023

(87) PCT Pub. No.: WO2022/219281

PCT Pub. Date: Oct. 20, 2022

(65) Prior Publication Data

US 2024/0208852 A1 Jun. 27, 2024

(30) Foreign Application Priority Data

Apr. 13, 2021 (FR) ...................................... 2103807

(51) Int. Cl.
*C03B 35/18* (2006.01)
*C03B 23/033* (2006.01)

(52) U.S. Cl.
CPC .......... *C03B 35/187* (2013.01); *C03B 23/033* (2013.01); *C03B 35/181* (2013.01)

(58) Field of Classification Search
None
See application file for complete search history.

(56) References Cited

U.S. PATENT DOCUMENTS 3,871,855 A * 3/1975 Frank .................... C03B 23/033 65/273
4,311,509 A 1/1982 Reader et al.
(Continued)

FOREIGN PATENT DOCUMENTS

| | | |
|---|---|---|
| CN | 207877583 U | 9/2018 |
| DE | 20 2008 007005 U1 | 7/2008 |
| FR | 2 520 345 A1 | 7/1983 |

OTHER PUBLICATIONS

WO 2020/200977 machine translation, Du Moulinet D'Hardemare et al., Conveying of Glass Sheets by Means of Curved Rollers, Oct. 2020 (Year: 2010).*

(Continued)

*Primary Examiner* — Queenie S Dehghan
(74) *Attorney, Agent, or Firm* — CUSHMAN PARTNERS LLC

(57) ABSTRACT

A conveyance device for glass sheets advancing them one after the other, includes at least one roller including a glass sheet conveyance area, the device including actuators located on either side of the conveyance area capable of bending the roller within its elastic deformation domain while leaving it able to be driven in rotation around fixed centers of its sections, wherein the roller includes a shaft and a plurality of bending rings into which the shaft is inserted.

28 Claims, 7 Drawing Sheets

(56) References Cited

U.S. PATENT DOCUMENTS

| | | | | |
|---|---|---|---|---|
| 4,381,933 | A * | 5/1983 | Schultz | C03B 35/165 65/273 |
| 4,773,925 | A | 9/1988 | Schultz | |
| 2006/0144090 | A1 * | 7/2006 | Yoshizawa | C03B 35/161 65/288 |
| 2007/0213188 | A1 | 9/2007 | Yao | |

OTHER PUBLICATIONS

WO 2013118537 machine translation, Inoue Shunji, Heat Treatment Device and Heat Treatment Method, Aug. 2013 (Year: 2013).*
WO 2010113979 machine translation, Ohtsubo Nozomi, Device and Method for Bending Glass Sheet, Oct. 2010 (Year: 2010).*
JP H0952724 machine translation, Yoshino Kohei, Bending Device and Method for Sheet Glass, Feb. 1997 (Year: 1997).*
International Search Report as issued in International Patent Application No. PCT/FR2022/050687, dated Jul. 19, 2022.

* cited by examiner

[Fig 1]
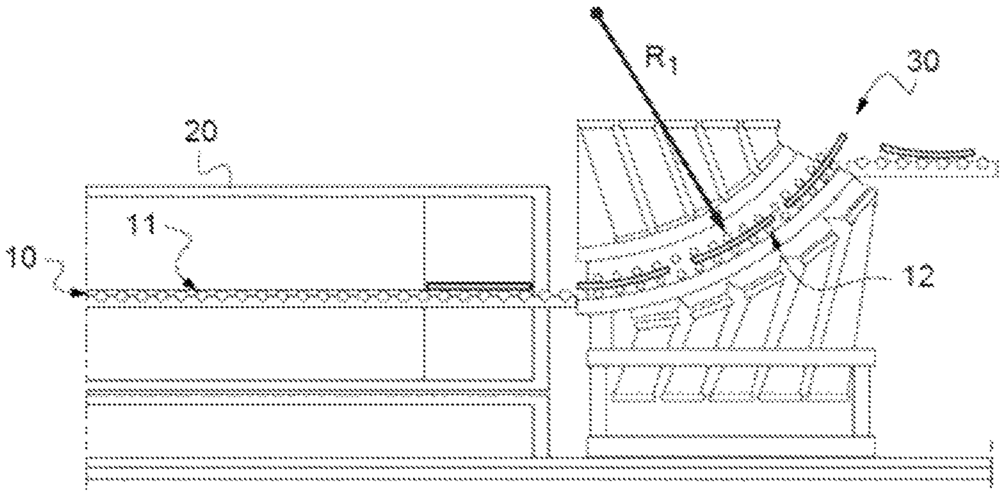
[Fig 2]
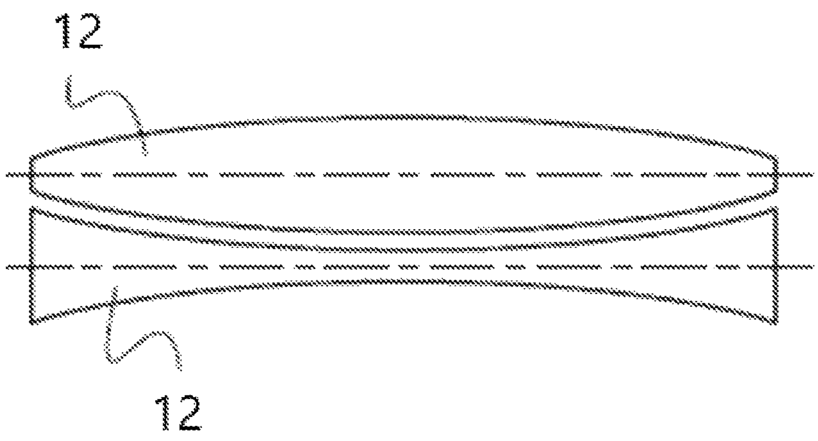

[Fig 3]
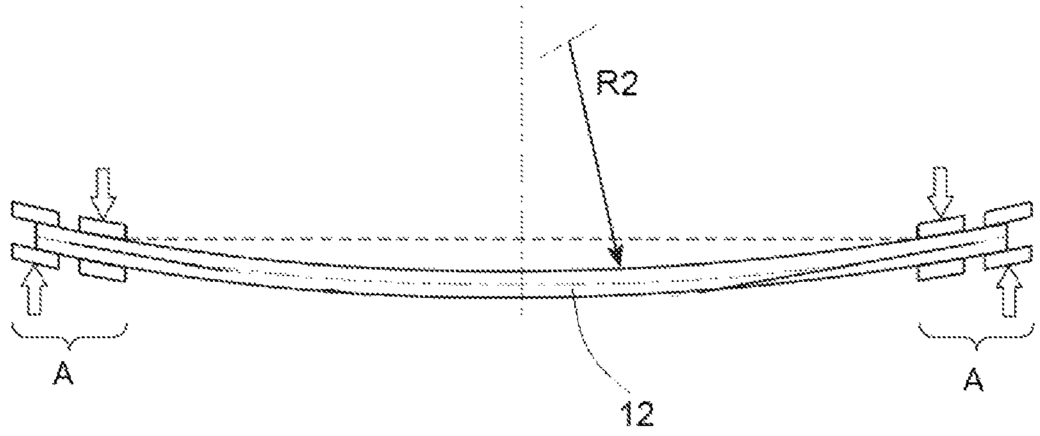
[Fig 4]
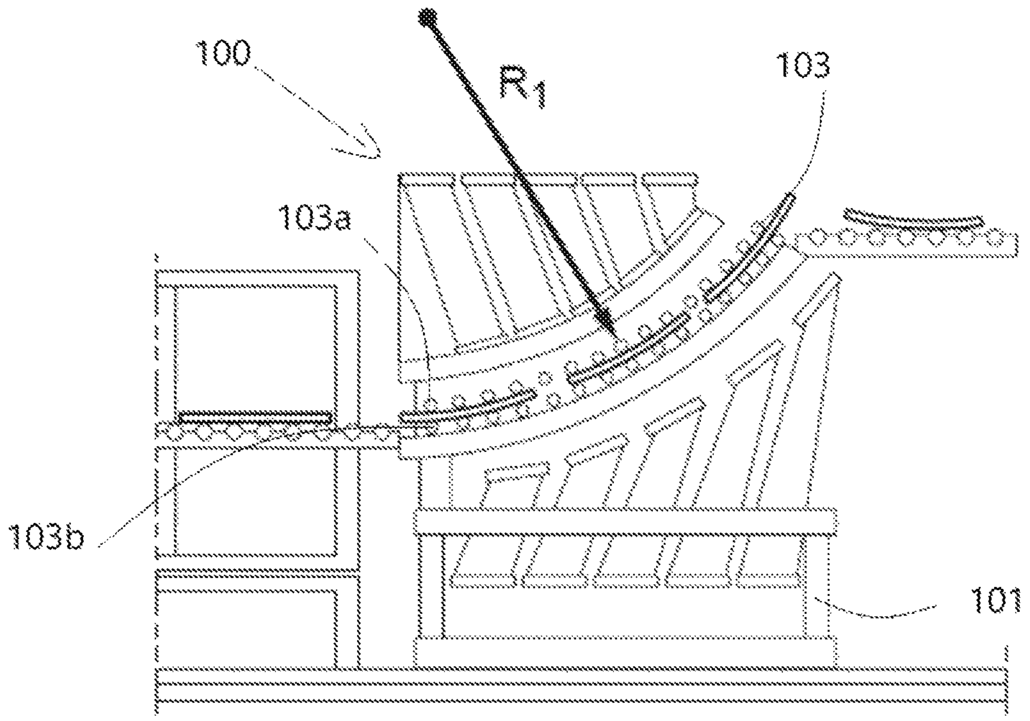

[Fig 4']
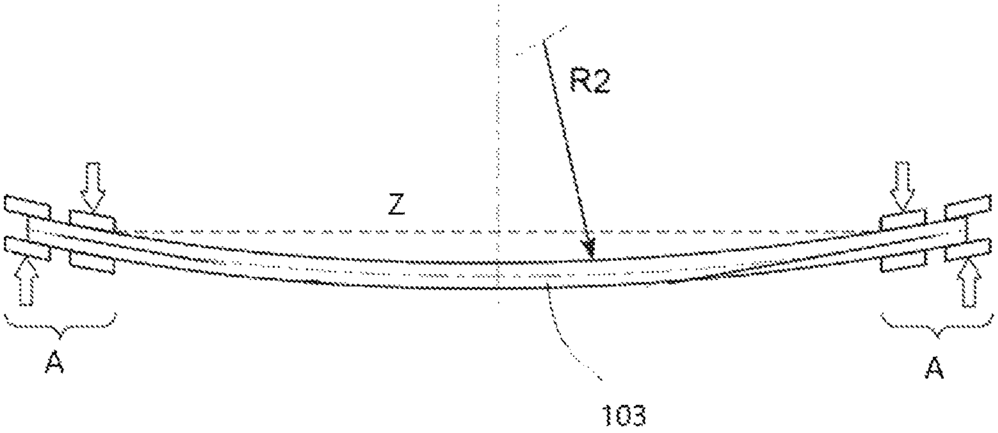
[Fig 5]
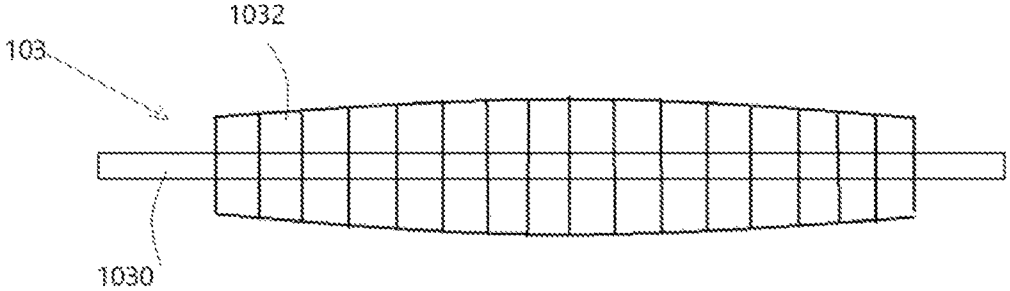
[Fig 6a]
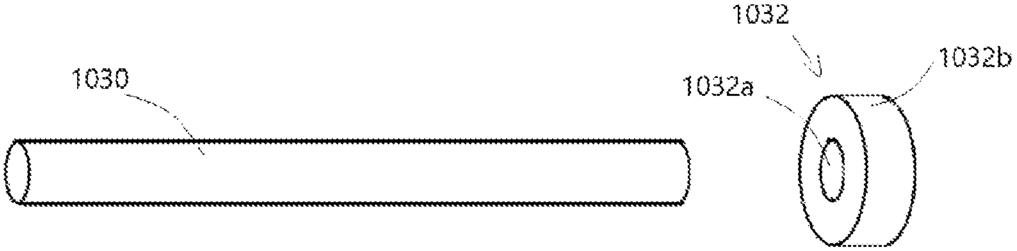

[Fig 6b]
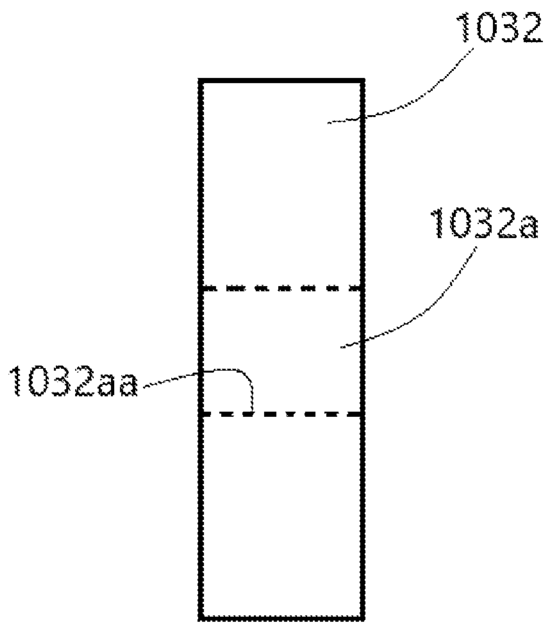
[Fig 7]
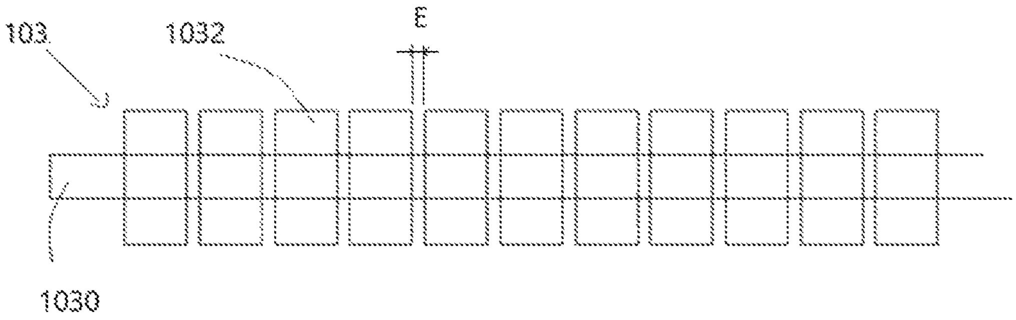

[Fig 8]
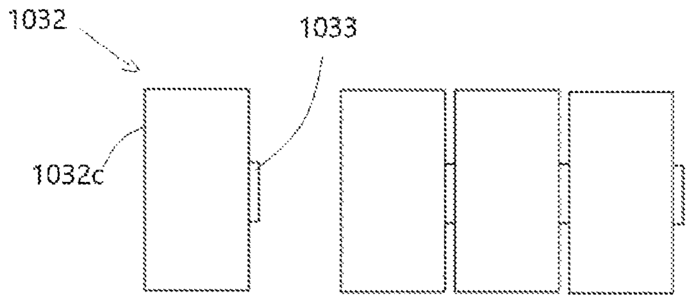
[Fig 9]
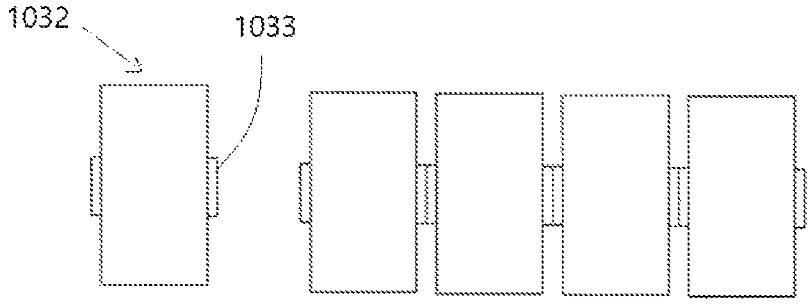
[Fig 10]
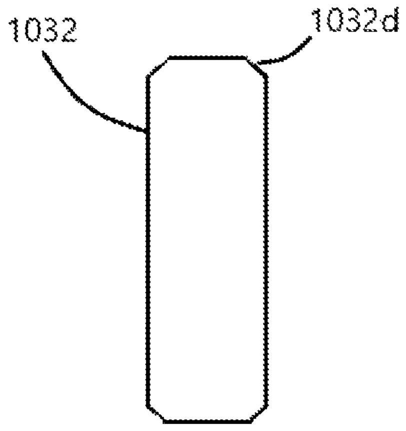

[Fig 11]
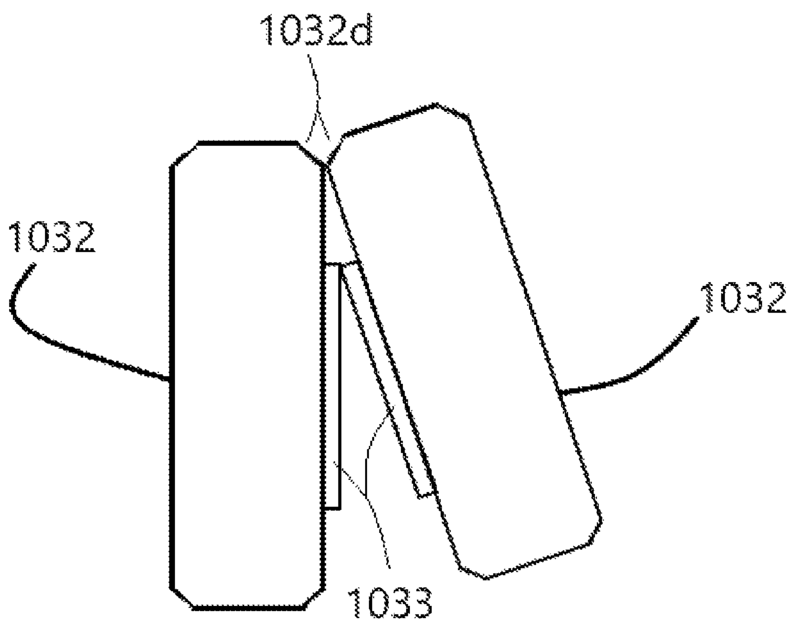
[Fig 12]
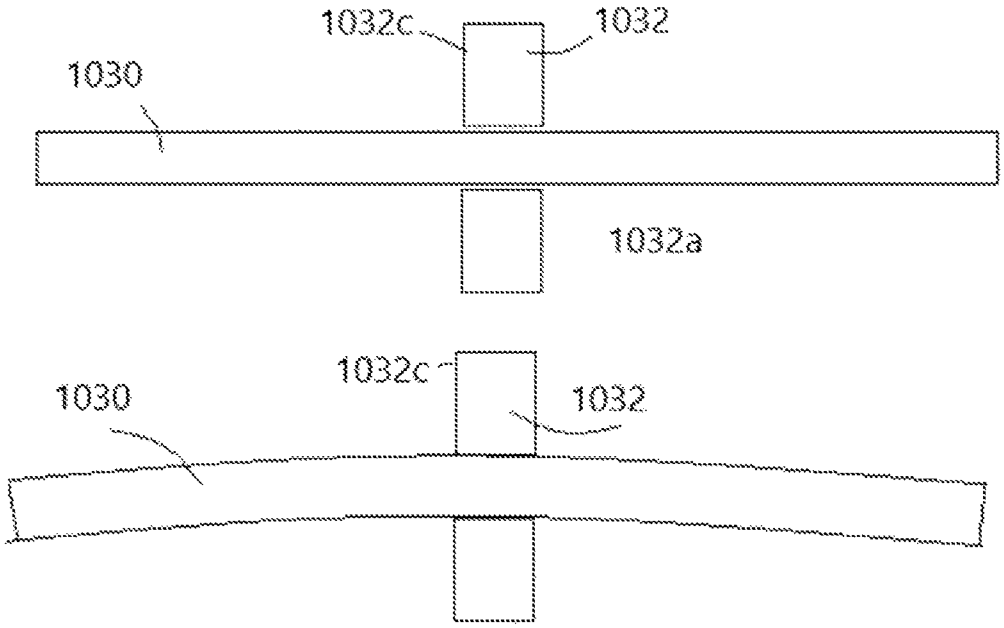

[Fig 13]
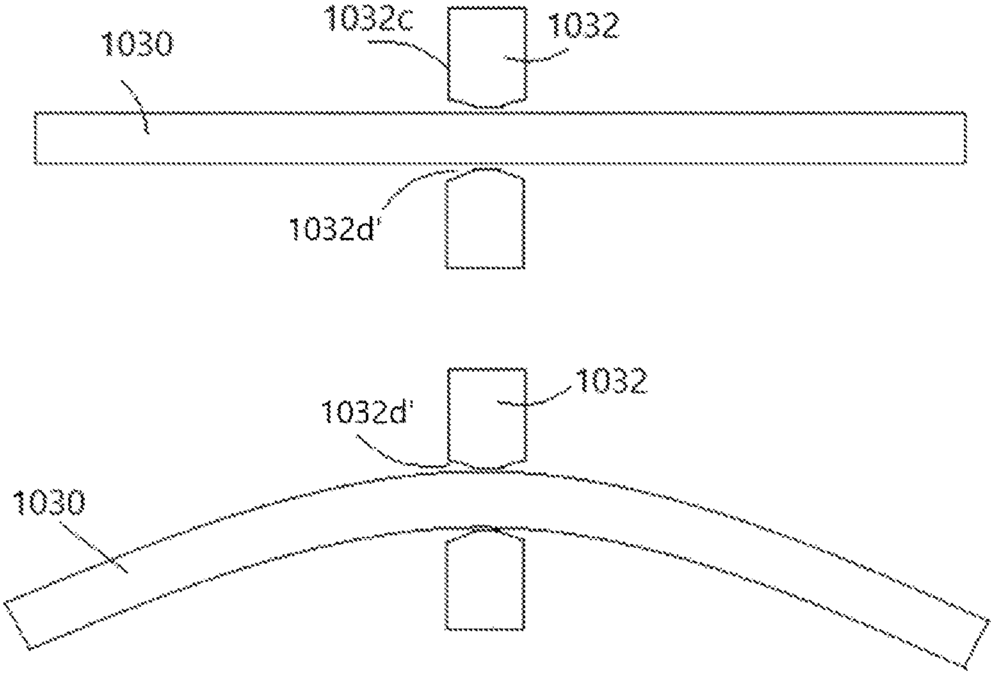

ROLLER FOR GLASS SHEET CONVEYING DEVICE

CROSS-REFERENCE TO RELATED APPLICATIONS

This application is the U.S. National Stage of PCT/FR2022/050687, filed Apr. 12, 2022, which in turn claims priority to French patent application number 2103807 filed Apr. 13, 2021. The content of these applications are incorporated herein by reference in their entireties.

PRIOR ART

The present invention relates to techniques for obtaining curved and optionally thermally tempered glass sheets, whether the sheets are curved in cylindrical shapes or complex non-cylindrical shapes.

More particularly, the invention relates to such techniques wherein the glass sheets are made to advance over at least one shaping bed consisting of shaping rods, for example rotating elements arranged along a path with a curved profile in the direction of advancement of the glass sheets, as shown in FIG. 1. The glass sheets are conveyed by advancing means 10 composed of rollers 11 making it possible to circulate glass sheets V between the various processing stations. Before passing by shaping rods 12, the glass sheets passed by a heating station 20 wherein the glass sheets are heated to their softening temperature, or about 600-700° C. before being conveyed to a shaping station 30 comprising the shaping rods 12. The curving may be performed by two shaping beds parallel to each other enabling a glass to be obtained with curvature R1.

The invention applies for example to the production of automotive glazing, for example of the side window type, or windshield or producing construction glass.

Such bending techniques are currently implemented with very high production speeds, particularly due to the possibility of causing the glass sheets to follow one another, each spaced apart from one another by only a few centimeters. They enable a very high reproducibility of the curve and of the optical quality of the final glazing.

In order to obtain glass sheets having a curvature in two different directions, preferably orthogonal, forming rods also called rollers have a specific profile.

In the case of shaping by two shaping beds parallel to one another, the shaping rods of each shaping bed facing one another have complementary profiles. Thus, if a shaping rod 12 of a first shaping bed has a convex profile, then the shaping rod of a second shaping bed facing it has a concave profile as shown in FIG. 2.

However, the shaping beds only make it possible to produce a specific bending and if it is desired to shape a glass sheet with another curvature, this requires constructing, for each new series of curved glass sheets, a new shaping bed with a long and precise assembly of new shaping rods.

In order to offer flexibility to the shaping beds, curving machines have been installed wherein the shaping rods 12 are flexed or bent by actuators A as shown in FIG. 3. This flexing or bending of the shaping rods makes it possible to adjust their position or their curvature R2 in the event of adjustment.

This flexing also makes it possible to substantially modify the possible curvature by the shaping rods so that it is possible to produce glass having a more or less pronounced curvature compared to the initial profiles of these rods.

However, this flexing has limits. The first limit is that of the material with which the shaping rods are formed. In fact, this material has mechanical properties such as a Young's modulus and if the force exerted by the flexing is too great, the shaping rod risks plasticizing, that is, no longer capable of returning to its initial shape when the shaping rod is no longer being flexed. Furthermore, the concave or convex shape of the rollers makes their deformation complex to control because the stresses are not homogenous.

One solution for increasing the flexing capacity of the shaping rods is to reduce the diameter of the shaping rods. This reduction in the diameter of the rods, although it makes it possible to have greater flexion, causes another limit in the shaping. Indeed, by replacing the shaping rods by rods of smaller diameter, we end up with a spacing between the two shaping beds that is modified and which increases. This modification of the spacing then causes a modification of the bending machine so that all the forming rods must be repositioned.

SUMMARY OF THE INVENTION

The present invention seeks to resolve the problems of the prior art by providing an improvement to the current bending methods and machines wherein the forming rods allow greater bending and therefore a wider range of use.

To that end, the invention relates to a conveyance device for glass sheets advancing them one after the other, comprising at least one roller comprising a glass sheet conveyance area, said device comprising actuators located on either side of the conveyance area capable of bending the roller within its elastic formation domain while leaving it able to be driven in rotation around fixed centers of its sections, characterized in that said roller comprises a shaft and a plurality of bending rings into which said shaft is inserted, the rings being tightly mounted on said shaft.

According to one example, the device comprises a plurality of said roller, that are parallel to one another, forming a web of rollers in contact with which the glass sheets may be conveyed one after the other.

According to one example, the roller is a first roller, said device comprising a second such roller, these two rollers called roller pair, generally having different dimensions and being parallel to one another and with a constant spacing over their full length.

According to one example, the device comprises a plurality of roller pairs forming a web of lower rollers and a web of upper rollers for exerting a bending on the glass sheets passing between these two webs of rollers, said bending having at least one transverse direction perpendicular to the direction of conveyance of the glass sheets.

According to one example, the webs of rollers have a curved profile ascending or descending in the direction of conveyance of the glass sheets in order also to exert a longitudinal bending on the glass sheets.

According to one example, the actuators are capable of giving to the roller on either side of the conveyance area, a dimension and a direction giving it an asymmetrical shape relative to the plane orthogonal to it and located equidistant from the actuators.

According to one example, the bending rings of said roller are dimensioned in order to give it to give a specific profile.

According to one example, the bending rings are mounted such that the spacing between the lateral faces of two contiguous bending rings is greater than 0 mm and less than 5 mm, more preferentially between 0.3 and 3 mm and still more preferentially between 0.5 and 1.5 mm.

According to one example, the spacing between the bending rings is constant.

According to one example, each bending ring comprises at least one projection on one of these lateral faces ensuring the spacing between the lateral faces of two contiguous rings.

According to one example, each bending ring comprises a projection on each of these lateral faces ensuring the spacing between the lateral faces of two contiguous rings.

According to one example, the bending rings comprise a chamfer at each edge between the section and a lateral face.

According to one example, each bending ring comprises a central opening having an inner face, said inner face comprising a chamfer on each edge between the inner face and a lateral face. According to one example, the chamfers have a width between 0.1 and 0.5 mm, preferably between 0.2 and 0.4 mm with an angle of between 30 and 60°, preferably 45°.

According to one example, the chamfers have a width between 1 and 5 mm, preferably between 2 and 4 mm an angle of between 10 and 60°, preferably between 15 and 45°.

BRIEF DESCRIPTION OF THE FIGURES

Other particular features and advantages will become clear from the following description thereof, given by way of illustration and entirely nonlimitingly, with reference to the appended drawings, in which:

FIGS. 1 to 3 represent a bending station and rollers according to the prior art;

FIGS. 4 and 4' represent the bending station and the bending actuators according to the prior art;

FIGS. 5, 6*a*, 6*b* represent a roller of the device according to the invention.

FIGS. 7 to 13 represent various configurations and embodiments of the roller of the device according to the invention;

DETAILED DESCRIPTION

In FIG. 4, a bending device 100 is represented. This bending device (also called bending machine) comprises a frame 101 on which a glass sheet conveying device is arranged. This bending device comprises at least one roller 103 called first roller 103*a* (also called shaping rod). The roller 103 comprising a glass sheet conveying area Z. A bending device comprises at least one first area called bending wherein a glass sheet is shaped. Generally, there is a second area. This area is used for cooling and/or tempering the shaped glass sheet.

This bending device 100 comprises, in a first implementation, at least two first rollers 103*a*, preferably a series, arranged in the same plane and forming a web of rollers in contact with which the glass sheets may be conveyed one after the other. The first rollers 103 of the web are positioned in order to be parallel to one another.

In a second implementation, the bending device 100 comprises, in furtherance to the bending device of the first implementation, at least a second roller 103*b*. This second roller 103*b* forms, with a first roller 103*a*, a pair of rollers 103 generally having different dimensions and being parallel to one another and with a constant spacing over their full length.

In this second implementation, the bending device comprises a plurality of roller pairs 103 forming a web of lower rollers and a web of upper rollers for exerting a bending on the glass sheets passing between these two webs of rollers, said bending having at least one transverse direction perpendicular to the direction of conveyance of the glass sheets in order to obtain a curvature R1.

Each roller 103 of the web of lower rollers and of the web of upper rollers is connected, by each end, to actuators A as shown in FIG. 4'. These actuators are situated on either side of the conveyance area Z and are capable of bending the roller 103 within its elastic domain of deformation. An actuator A is an apparatus acting on a region of the roller outside the conveyance area Z of the roller 103 to force the roller to take a certain height (that is, dimension) and a certain direction. An actuator may comprise at least a cylinder system comprising a movable part and a fixed part connected to the frame of the device. The movement of the movable part of the cylinder causes it to move the end of the roller vertically. This bending enables a symmetrical or asymmetrical transverse curvature R2 to be obtained.

Cleverly according to the invention, each roller 103 comprises a shaft 1030, straight, cylindrical produced from a material having an elastic domain of deformation. Each roller 103 further comprises a series of bending rings 1032 as shown in FIG. 5. Each bending ring 1032 has a central opening 1032*a*. Each central opening 1032*a* has an inner face 1032*aa* enabling it to cooperate with said shaft, as shown in FIGS. 6*a* and 6*b*. It is understood by this that the shaft 1030 is inserted into the central opening 1032*a* of the series of bending rings 1032. The bending rings 1032 are mounted tightly onto the shaft. The rotation of the shaft 1030 then causes the rotation of the rings 1032.

According to the invention, this configuration of a roller 103, comprising a shaft 1030 and rings 1032, is cleverly used within the framework of the first area of the bending device.

Each bending ring 1032 is in the form of a ring further comprising an annular section 1032*b*. The bending rings 1032 of the series are designed so that, together, they give the roller a particular profile, in other words the annular sections 1032*b* of the bending rings allow the roller 103 to have a profile that is concave or convex, or more complex associating concavity and convexity. Thus, each bending ring 1032 may have a different diameter and/or an annular section inclined relative to the axis of the shaft.

This use of the rings is advantageous because it makes it possible to obtain more complex profiles. The addition of the complex profile formed by the rings and the deformation of said complex profile caused by the bending enables the creation of rollers having an even more complex profile.

These bending rings 1032 are produced from a material capable of withstanding temperatures of at least 500° C., and even more.

The bending rings 1032 have a width between 5 and 20 mm, preferably between 10 and 15 mm.

The bending rings 1032 are locked in position by two locking rings 105 arranged at the ends of said series of bending rings 1032.

The advantage of this configuration with a shaft 1030 and bending rings 1032 is being able to use a shaft for which the flexing or elastic deformation properties are greater than the existing rollers.

Indeed, compared to a roller composed of a single piece, the shaft 1030 of the roller according to the invention has a smaller diameter and therefore allows greater flexing.

The bending rings 1032 are then used to fit onto the shaft 1030 and give it the desired dimensions. These desired dimensions are preferably the same, particularly the diameter, as a roller of the prior art, that is, of a single piece. This configuration allows the roller according to the invention to have greater flexibility and therefore enables greater variations of curvatures thanks to the central shaft 1030 having a smaller diameter but keeping controllable outside dimensions, and especially those that are identical to a roller of the prior art allowing the replacement of said roller without having to modify the settings of the bending station. Preferentially, the rings are arranged on the shaft to form a substantially continuous profile.

These locking rings 105 are used, notwithstanding the tight mounting, to hold the bending rings 1032 in place over time. In fact, during bending, the flexing and bringing to temperature may cause a loosening of the bending rings 1032 on the shaft. These locking rings make it possible to limit this loosening.

The bending rings 1032 comprise lateral faces 1032*c* and are positioned on the shaft 1030 so that the spacing E between the lateral faces of two contiguous rings 1032 is greater than 0 and less than 5 mm, more preferentially between 0.3 and 3 mm and still more preferentially between 0.5 and 1.5 mm as shown in FIG. 7. This spacing E between two rings 1032 may or may not be constant, that is, all the rings 1032 of a roller have the same spacing, or this spacing E may vary.

The presence of such a spacing E makes it possible, during the flexing of the shaft 1030, for the rings 1032 to move relative to one another in order to follow the curvature taken by said shaft 1030. This spacing does not hinder the continuity of the rings on the shaft and therefore the continuity of the roller.

In a first embodiment, the spacing E between the rings 1032 is controlled by a spacing control means. This spacing control means comprises at least one projection 1033 arranged on one of the lateral faces 1032*c* of the bending rings 1032. Each bending ring 1032, annular in shape, thus comprises two lateral faces 1032*c* by which it is in contact with two bending and/or locking rings. These lateral faces 1032*c* are preferably parallel. This projection 1033 preferentially is in the form of a circle arranged around the opening 1032*a* through which the shaft passes. This projection 1033 is between 0.5 and 1.5 mm, preferably 1 mm. This projection 1033 may take other shapes allowing the spacing E to be maintained constant.

In one implementation, each bending ring 1032 comprises a projection 1033 as shown in FIG. 8, the bending rings 1032 being arranged between them in such a way that the lateral face 1032*c* with projection 1033 of each bending ring 1032 is in contact with the lateral face 1032*c* without projection 1033 of an adjacent/contiguous ring. In this implementation, one of the bending rings 1032 has its projection 1033 in contact with a locking ring. In this implementation, the sole projection is between 0.5 and 1.5 mm, preferably 1 mm.

In another implementation, each bending ring 1032 comprises two projections 1033 as shown in FIG. 9, one on each lateral face 1032*c*. This implementation makes it possible to guarantee a constant spacing E while eliminating any mishandling, that is, by avoiding, for rings 1032 having a single projection 1033, having two projection in contact with one another. These projections 1033 also make it possible, in combination with locking rings, to guarantee that the rings do not move relative to one another during production, particularly according to the flexing cycles of the rollers in a hot environment. These flexing cycles in hot environment may cause a loosening of the tight mounting of each of the rings so that they may become contiguous with one another, leaving large spaces and creating optical defects. In this implementation, the sum of the thicknesses of the projections 1033 must be between 0.5 and 1.5 mm, preferably 1 mm. Preferably the projections 1033 are identical so that, for a total projection of 1 mm, the projection of each lateral face is equal to 0.5 mm.

In a second embodiment, the bending rings 1032 are chamfered as shown in FIG. 10. Each ring 1032 thus comprises a chamfer 1032*d* on the edge between the section 1032*b* and a lateral face 1032*c*. This chamfer 1032*d* extends over the entirety of said edge. Thus, each ring 1032 comprises two chamfers 1032*d*. The section 1032*b* of each ring thus comprises a central portion surrounded by two chamfered areas.

These chamfers 1032*d* are used to facilitate the flexing of the roller according to the invention, as shown in FIG. 11. In fact, the flexing of the shaft 1030 of the roller tends to draw the rings towards one another. Without a chamfer, the flexing limit is reached when the edges of two adjacent bending rings 1032 touch one another. Increasing the flexing would be likely to cause a deterioration of the bending rings. This deterioration of the rings 1032 may cause the appearance of traces, scratches on the glass during its passage between the bending rings.

Separating the rings is a solution to remedy this: by separating the rings, more flexing is allowed. However, this separation must be limited to avoid separation causing an optical defect of the glass.

The chamfer 1032*d* is an alternative or additional solution to this problem of convergence of the rings during flexing of the shaft carrying them. Indeed, the chamfer 1032*d*, which consists of removing material, enables greater flexing of the central shaft before two adjacent bending rings come into contact.

This chamfer 1032*d* of the bending rings 1032 is carried out in such a way that each chamfer 1032*d* has a maximum width of between 0.1 and 0.5 mm, preferably between 0.2 and 0.4 mm. These chamfers have an angle of between 30 and 60°, preferably 45°. These chamfers make it possible to increase, at the edges, the separation between two contiguous rings 1032.

In a third embodiment, the rings 1032 comprise, at the inner face 1032*aa* in contact with the shaft 1030, a non-flat profile as shown in FIG. 13. By that it is understood that the inner face 1032*aa* has a surface in contact with said shaft 1030 that is smaller at the contact surface for a contact face with a flat or lower profile. For this purpose, the profile is chamfered, provided with chamfer(s) 1032*d'*, so that the central opening 1032*a* is larger at the lateral faces 1032*c* then at the center as shown in FIG. 13. This chamfer 1032*d'* is arranged on each edge between the inner face 1032*aa* and a lateral face 1032*c*. This particular profile allows the flexing of the shaft to be supported during bending.

In fact, during bending the shaft is deformed but not the rings. Thus, if the rings are too wide, the flexing of the shaft may be limited by said rings as shown in FIG. 12.

The present embodiment makes it possible to limit the impact of the rings by limiting "their presence" by making these rings have more localized contact. The reduction in the contact surface in the direction of the width by chamfers 1032*d'* makes it possible to locally increase the degree of freedom of flexing of the shaft 1030. During flexing of the shaft, the chamfers thus allow greater flexing.

This also allows less constraint of the rings and therefore avoids their deformation and they therefore become movable relative to the shaft.

Each chamfer 1032*d'* has a maximum width between 1 and 5 mm, preferably between 2 and 4 mm. These chamfers have an angle of between 10 and 60°, preferably between 15 and 45°.

In another embodiment, the bending rings 1032 are slotted. This slot is radial and extends over the full width of the section 1032*b*. This slot enables the assembly of the ring with said shaft to be facilitated.

In another embodiment, the shaft 1030 comprises a treatment enabling a better grip of the bending rings with the shaft. This treatment is intended to increase the coefficient of friction of the shaft. This treatment may be shot peening or any other treatment enabling an increase in the coefficient of friction to be obtained. With an increased coefficient of friction, the possibilities for a bending ring to move along the shaft or to turn around said shaft are reduced.

In another embodiment, each roller may be associated with heat shielding in the form of a layer of a mesh type interlayer material consisting of refractory fibers such as silica, metal or polymer resistant to high temperature, such as Kevlar® fibers for example. This enables a soft contact between the glass and the rings while smoothing the thermal effects.

Of course, the present invention is not limited to the illustrated example but is susceptible to various variants and modifications which will become apparent to the person skilled in the art.

The invention claimed is:

1. A conveyance device for glass sheets advancing them one after the other, comprising:
- at least one roller comprising a glass sheet conveyance area,
- actuators located on either side of the conveyance area capable of bending each of the at least one roller within its elastic deformation domain while leaving it able to be driven in rotation around a central axis thereof,
- wherein said at least one roller comprises a shaft and a plurality of bending rings into which said shaft is inserted, the rings being tightly mounted on said shaft and the rings being arranged on the shaft to form a substantially continuous profile for engaging the glass;
- wherein each bending ring comprises a central opening having an inner face, said inner face comprising a chamfer on each edge between the inner face and a lateral face.

2. The device according to claim 1, wherein the chamfers have a width between 1 and 5 mm and an angle of between 10 and 60°.

3. The device according to claim 2, wherein the chamfers have a width between 2 and 4 mm and an angle of between 15 and 45°.

4. The bending device according to claim 1, wherein the bending rings each comprises another chamfer on each edge between a radially facing surface and each lateral face.

5. The bending device according to claim 4, wherein the another chamfers have a width between 0.2 and 0.4 mm 0.1 and 0.5 mm.

6. The bending device according to claim 5, wherein the another chamfers have a width between 0.1 and 0.5 mm with an angle of between 30 and 60°.

7. The bending device according to claim 4, wherein the another chamfers have a width between 0.2 and 0.4 mm.

8. A method of manufacturing a glass sheet comprising:
- using the conveyance device of claim 1 such that the substantially continuous profile formed by the rings engages and deforms the glass sheet; and
- cooling and/or tempering the deformed glass sheet.

9. A conveyance device for glass sheets advancing them one after the other, comprising:
- at least one roller comprising a glass sheet conveyance area,
- actuators located on either side of the conveyance area capable of bending each of the at least one roller within its elastic deformation domain while leaving it able to be driven in rotation around a central axis thereof,
- wherein said at least one roller comprises a shaft and a plurality of bending rings into which said shaft is inserted, the rings being tightly mounted on said shaft and the rings being arranged on the shaft to form a substantially continuous profile for engaging the glass;
- wherein the bending rings each comprises a chamfer on each edge between a radially facing surface and a lateral face;
- wherein the chamfers have a width between 0.1 and 0.5 mm with an angle of between 30 and 60°.

10. The device according to claim 9, comprising a plurality of said rollers, that are parallel to one another, forming a web of rollers in contact with which the glass sheets are conveyed one after the other.

11. The device according to claim 9, wherein the at least one roller is a first roller, said device comprising a second roller, the first and second rollers forming a roller pair, generally having different dimensions and being parallel to one another and with a constant spacing over their full length.

12. The device according to claim 11, comprising a plurality of roller pairs forming a web of lower rollers and a web of upper rollers for exerting a bending on the glass sheets passing between the webs of lower and upper rollers, said bending having at least one transverse direction perpendicular to the direction of conveyance of the glass sheets.

13. The device according to claim 12, wherein the webs of lower and upper rollers have a curved profile ascending or descending in the direction of conveyance of the glass sheets in order also to exert a longitudinal bending on the glass sheets.

14. The device according to claim 9, wherein the actuators are capable of giving to the roller on either side of the conveyance area, a dimension and a direction giving it an asymmetrical shape relative to a plane orthogonal to it and located equidistant from the actuators.

15. The device according to claim 9, the bending rings of said roller are dimensioned in order to give it a specific profile.

16. The device according to claim 9, wherein the bending rings are mounted such that a spacing between lateral faces of two contiguous bending rings is greater than 0 mm and less than 5 mm.

17. The device according to claim 16, wherein the spacing between the bending rings is constant.

18. The device according to claim 17, wherein each bending ring comprises at least one projection on one of the lateral faces ensuring the spacing between the lateral faces of two contiguous rings, each projection being spaced radially inwardly from an outer peripheral edge of its respective ring.

19. The device according to claim 18, wherein the at least one projection comprises a projection on each of the lateral faces of each bending ring ensuring the spacing between the lateral faces of two contiguous rings, each projection being spaced radially inwardly from an outer peripheral edge of its respective ring.

20. The device according to claim 9, wherein the bending rings are mounted such that the spacing between the lateral faces of two contiguous bending rings is between 0.3 and 3 mm.

21. The device according to claim 9, wherein the bending rings are mounted such that the spacing between the lateral faces of two contiguous bending rings is between 0.5 and 1.5 mm.

22. The device according to claim 9, wherein the chamfers have a width between 0.2 and 0.4 mm.

23. The device according to claim 9, wherein the angle is 45°.

24. The device according to claim 9, wherein each bending ring comprises at least one projection on one of the lateral faces ensuring a spacing between the lateral faces of two contiguous rings, each projection being spaced radially inwardly from an outer peripheral edge of its respective ring.

25. The device according to claim 24, wherein the at least one projection comprises a projection on each of the lateral faces of each bending ring ensuring the spacing between the lateral faces of two contiguous rings, each projection being spaced radially inwardly from an outer peripheral edge of its respective ring.

26. A method of manufacturing a glass sheet comprising:

using the conveyance device of claim 9 such that the substantially continuous profile formed by the rings engages and deforms the glass sheet; and cooling and/or tempering the deformed glass sheet.

27. A conveyance device for glass sheets advancing them one after the other, comprising:

at least one roller comprising a glass sheet conveyance area, actuators located on either side of the conveyance area capable of bending each of the at least one roller within its elastic deformation domain while leaving it able to be driven in rotation around a central axis thereof, wherein said at least one roller comprises a shaft and a plurality of bending rings into which said shaft is inserted, the rings being tightly mounted on said shaft and the rings being arranged on the shaft to form a substantially continuous profile for engaging the glass wherein the bending rings each comprises a chamfer on each edge between a radially facing surface and a lateral face;

wherein the chamfers have a width between 0.2 and 0.4 mm.

28. A method of manufacturing a glass sheet comprising:

using the conveyance device of claim 27 such that the substantially continuous profile formed by the rings engages and deforms the glass sheet; and cooling and/or tempering the deformed glass sheet.

* * * * *